US010775286B2

(12) United States Patent
Gu

(10) Patent No.: US 10,775,286 B2
(45) Date of Patent: Sep. 15, 2020

(54) METHOD FOR TEST DATA REDUCTION OF COMPOSITE INTRALAMINAR FAILURE MODE

(71) Applicant: The Boeing Company, Chicago, IL (US)

(72) Inventor: Haozhong Gu, Ballwin, MO (US)

(73) Assignee: THE BOEING COMPANY, Chicago, IL (US)

( * ) Notice: Subject to any disclaimer, the term of this patent is extended or adjusted under 35 U.S.C. 154(b) by 457 days.

(21) Appl. No.: 15/009,777

(22) Filed: Jan. 28, 2016

(65) Prior Publication Data

US 2017/0219469 A1 Aug. 3, 2017

(51) Int. Cl.
| | |
|---|---|
| *G01N 3/08* | (2006.01) |
| *G06F 30/15* | (2020.01) |
| *G06F 30/23* | (2020.01) |
| *B32B 41/00* | (2006.01) |
| *G01N 3/00* | (2006.01) |
| *B32B 7/02* | (2019.01) |
| *G06F 111/10* | (2020.01) |
| *G06F 113/26* | (2020.01) |

(52) U.S. Cl.
CPC .............. *G01N 3/08* (2013.01); *G06F 30/15* (2020.01); *G06F 30/23* (2020.01); *B32B 7/02* (2013.01); *B32B 2041/04* (2013.01); *B32B 2307/54* (2013.01); *B32B 2605/00* (2013.01); *G01N 3/00* (2013.01); *G06F 2111/10* (2020.01); *G06F 2113/26* (2020.01)

(58) Field of Classification Search
CPC ........ G01N 3/08; G01N 3/00; G06F 17/5095; G06F 17/5018; G06F 2217/44; G06F 2217/16; B32B 2605/00; B32B 2307/54; B32B 7/02; B32B 2041/04
See application file for complete search history.

(56) References Cited

PUBLICATIONS

Laffan et al., "Measurement of the in situ ply fracture toughness associated with mode I fibre tensile failure in FRP. Part II: Size and lay-up effects", Dec. 28, 2009, Composites Science and Technology, 70 (2010) 614-621.*
Pinho, S. T. et al., "Fracture toughness of the tensile and compressive fibre failure modes in laminated composites", Feb. 21, 2006, Composites Science and Technolody 66(2006), pp. 2069-2079 (Year: 2006).*
European Search Report in corresponding EP Application No. 17 15 3563 dated Jun. 8, 2017, 7 pages.
(Continued)

*Primary Examiner* — Leslie J Evanisko
*Assistant Examiner* — Leo T Hinze
(74) *Attorney, Agent, or Firm* — MH2 Technology Law Group LLP

(57) ABSTRACT

A method to utilize the results from a series of FEM models to develop a master derivative of compliance curve. The use of the unique master curve resolves the test data variability issue caused by fitting the compliance curve individually. The analytically derived derivative of compliance curve eliminates the needs to take the derivative of compliance and therefore the derivative computation error no longer exists. By applying the existing solution and the solution as disclosed and claimed herein to the same set of the raw test data, it is found that data scatter is significantly reduced.

20 Claims, 6 Drawing Sheets

(56) References Cited

PUBLICATIONS

Laffan, M.J. et al., "Measurement of the in situ ply fracture toughness associated with mode I fibre tensile failure in FRP. Part I: Data reduction", Composites Science and Technology, vol. 70, 2010, pp. 606-613.

"Fracture of Composite Compact Tension Specimens," AMMRC TR 76-9, Army materials and mechanics research center, Mar. 1976.

Filho, et al., "Intralaminar Fracture Toughness of Composite Laminates—A Numerical and Experimental Study," 21st Brazilian Congress of Mechanical Engineering, Oct. 24-28, 2011, Natal, RN, Brazil.

Piascik, et al., "An Extended Compact Tension Specimen for Fatigue Crack Propagation and Fracture," NASA Technical Memorandum 110243, Mar. 1996.

Donadon, et al., "Intralaminar Fracture Toughness Characterization of Composite Laminates," Instituto Tecnológico de Aeronautica—ITA, Brazil, 2011.

Moura, et al., "Interlaminar and intralaminar fracture characterization of composites under mode I loading" Composite Structures 92.1 (2010): 144-149.

Laffan, et al. "Translaminar fracture toughness testing of composites: a review." Polymer testing 31.3 (2012): 481-489.

Communication pursuant to Article 94(3) EPC dated Jun. 27, 2018 in corresponding European Application No. 17153563.6.

Rose et al., "Analysis Methods for Progressive Damage of Composite Structures," NASA/TM-2013-218024, Jul. 1, 2013, pp. 1-48.

Slepetz et al., "Fracture of Composite Compact Tension Specimens," Fracture Mechanics of Composites, Sep. 25, 1975, pp. 143-162.

Communication pursuant to Article 94(3) EPC dated May 7, 2019 in corresponding European Application No. 17153563.6, 10 pages.

Canadian Office Action dated Dec. 18, 2019 in corresponding Canadian Application No. 2,949,156, 3 pages.

Summons to attend oral proceedings pursuant to Rule 115(1) EPC dated Jun. 18, 2020 in corresponding European Application No. 17 153 563.6 (15 pages).

* cited by examiner

METHOD FOR TEST DATA REDUCTION OF COMPOSITE INTRALAMINAR FAILURE MODE

BACKGROUND

Field

This technology as disclosed herein relates generally to intra-laminar failures in composite materials and, more particularly, to reducing raw test data in lamina level composite failure mode testing.

Background

Matrix laminated composites are being applied increasingly in structures due to their high stiffness-to-weight and strength-to-weight ratios. However, they can develop internal damage, like matrix cracking and delamination, which degrades structural integrity leading to failure. The internal damage is not easily detectable. Transverse matrix cracking and delamination are a typical damage mechanism of composites especially when structures are submitted to bending loads.

There are two different failure mechanisms in composite failure. One is so called the intra-laminar failure in which the failure is happening within the laminar. The other is the inter-laminar failure where the delamination failure between layers. There is strong interaction between intra-laminar failure and inter-laminar failure. For example, the matrix crack initiated with a ply will lead to delamination at adjacent ply interface when the crack progress across plies. The measurement of both intra-laminar fracture toughness and inter-laminar fracture toughness are important. Since the matured ASTM test standard and associated test data reduction method for the inter-laminar fracture toughness is already exist, following discussion is focused on intra-laminar fracture.

The intra-laminar fracture characterization involves testing to produce two different type of fracture properties, namely fibre fracture property, and matrix fracture property. The fibre fracture is commonly characterized by a crack apparently running perpendicular to the fibre direction to break the fibre and is considered as direct cause leading to the composite ultimate failure. The matrix fracture, on the other hand, is characterized by a crack that is apparently running in parallel to fibres through the layers thickness and initiates the composite failure process. Both fracture properties are the fundamental material properties and are crucial for composite failure analysis.

The analysis that predicts the intra-laminar failure in composite laminate panels using energy-based evolution approach needs the laminar level of the strain energy release rate value input. This strain energy release rate value is a part of the material strength/energy data that is extracted from the certain type of material testing. Most of today's material data testing are conducted following national/industrial test standard. However, there is no test standard that exists for this type of testing for composites. Many researches performed in this field agree that the compact tension testing created originally for a metal material specimen can be used to extract the strain energy release rate for composite materials using different test data reduction methods. However, these data reduction methods either not reliable (significant scatter results), not compatible, or not applicable. The current compliance data reduction method has two major problems: 1) it fit the compliance curve individually with a number of the repeat test data and inherit the test data variability issue (this increases the variability of reduced results); 2) it fit the compliance curve, but results calculated from a formula involves the derivative of the compliance. Significant error is induced from taking derivative of the compliance. A better technique is needed to address the data scatter issue.

SUMMARY

One implementation the technology as disclosed herein includes an method for analyzing intra-laminar test data including modeling at a computer a test coupon using a finite element method for a plurality of crack lengths and a defined load and a displacement, said computer having a processor and a memory and where said modeling of the test coupon is performed by the processor and is based on parameter data stored in memory and representative of a known construction of a known composite material having known structural characteristics, and creating a modeled compliance curve of loads versus displacement by calculating an initial fracture energy for the test coupon for each of the plurality of crack lengths. The method can include calculating a derivative of the modeled compliance curve for each of the plurality of crack lengths and developing a master curve fitting derivative curve of compliance and gathering crack length test data and plotting compliance versus crack length test data. The method includes reducing the test data using the master curve fitting derivative curve.

One implementation of the technology as disclosed herein includes system for analyzing intra-laminar test data including a computer system including an electronic memory and a processor that is configured to access and process a finite element modeling algorithm stored in the electronic memory. The processor when processing the algorithm is configured to produce a finite element model of a test coupon constructed of a known composite material based on a known construction and known characteristics for a plurality of crack lengths and a defined load and a displacement. The processor is configured to access and process a compliance curve algorithm configured to generate a modeled compliance curve of loads versus displacement by calculating an initial fracture energy for the test coupon for each of the plurality of crack lengths and a defined load and a displacement. The processor is also configured to access and process a derivative algorithm configured to calculate a derivative of the modeled compliance curve for each of the plurality of crack lengths and develop a master curve fitting derivative curve of compliance. The processor can be configured to control the computing system to receive crack length test data at the computing system and plot compliance versus crack length test data and reduce the test data using the master curve fitting derivative curve.

The technology as disclosed and claimed includes a method and a system for a new test data reduction procedure that involves FEM analysis derived master fitting formula that fit the derivative of the compliance directly to address the test results scatter issue. This technology solves test data reduction method induced test results scatter issue. This method utilizes the results from a series of FEM models to develop a master derivative of compliance curve. The use of the unique master curve resolves the test data variability issue caused by fitting the compliance curve individually. The analytically derived derivative of the compliance curve eliminates the needs to take derivative of compliance and therefore the derivative computation error no longer exists. By applying the existing solution and technology as disclosed and claimed herein to the same set of the raw test data, it is found that repeated test results reduced using the technology as disclosed is much tighter with each other than those from existing method. The standard deviation of test results calculated using technology as disclosed and claimed is reduced to one-fourth of the value calculated using the existing method. This test data reduce method produces the reliable test results that is a critical input in the composite progressive failure analysis. The success of composite progressive failure predictions will reduce significant number of costly element/sub-component/component level testing. Therefore it meant to be a cost savings.

The technology as disclosed is very effective for loads that are low velocity and low impact bending loads, and composites used on broad load-carrying structures, such as a skin of aircraft. With coupon testing they use tension type loads that can be applied to any structure and any kind of loads. The technology as disclosed provides a means for obtaining fracture imaging, raw data doesn't give you the fracture imaging. Raw data gives the loads and crack length and loading displacements. From these three you want to derive the fracture imaging.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which.

Figure 1:
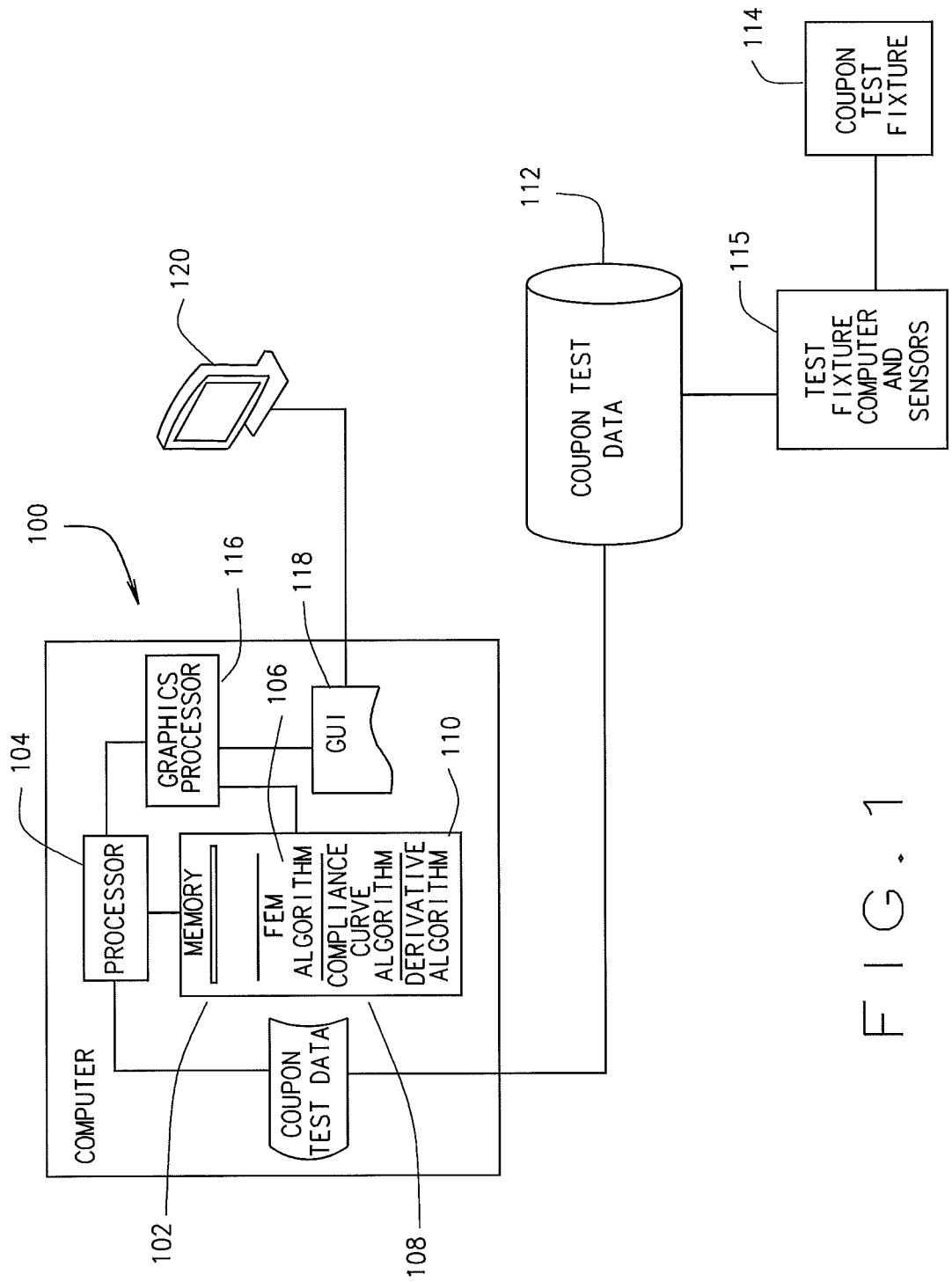
FIG. 1 is a system block diagram.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIG. 1-9 and like reference numerals are being used consistently throughout to refer to like and corresponding parts of the technology for all of the various views and figures of the drawing. Also, please note that the first digit(s) of the reference number for a given item or part of the technology should correspond to the FIG. number in which the item or part is first identified.

One implementation of the present technology as disclosed comprising a method and system for analyzing intra-laminar test data, which teaches a novel method and system for data reduction of intra-laminar strain relief test data for composite materials. An analysis that predicts intra-laminar failure in composite laminate panels using an energy based evolution approach needs the laminar level of the strain energy release rate value input. This strain energy release rate value is a part of the material strength/energy data that is extracted from the certain type of material testing. Most of today's material data testing are conducted following national/industrial test standards. However, there is no test standard that exists for this type of testing for composites. Many researches performed in this field agree that the compact tension testing created originally for a metal material specimen can be used to extract the strain energy release rate for composite materials using different test data reduction methods. We found that these data reduction methods either are not reliable (significant scatter results), not compatible, or not applicable.

The current compliance data reduction method that is traditionally used has two major problems: 1) the current compliance data reduction method fits the compliance curve individually with a number of the repeat test data and inherently, a test data variability issue arises (this increases the variability of reduced results); 2) the traditional data reduction method fits the compliance curve, but results calculated from a formula involves the derivative of the compliance, however, significant errors are induced from taking derivative of the compliance.

The technology as disclosed and claimed herein solves test data reduction method induced test results scatter issue. The technology as disclosed and claimed herein provides a new test data reduction procedure that involves an FEM analysis derived master fitting formula that fits the derivative of the compliance directly to address a test results scatter issue. The method as disclosed and claimed herein utilizes the results from a series of FEM models to develop a master derivative of compliance curve. The use of the unique master curve resolves the test data variability issue caused by fitting the compliance curve individually. The analytically derived derivative of compliance curve eliminates the need to take a derivative of compliance and therefore the derivative computation error no longer exists. By applying the existing solution and solution as disclosed herein to the same set of the raw test data, it is found that repeated test results indicate a significant reduction in standard deviation between data when using the technology as disclosed and claimed herein. The data grouping is much tighter than the data grouping resulting from the existing method. The standard deviation of test results calculated using the method as disclosed is reduced to one-fourth of the value calculated using the existing method.

The details of the technology as disclosed and various implementations can be better understood by referring to the figures of the drawing. Referring to FIG. 1 a system block diagram is shown. One embodiment of the system for analyzing intra-laminar test data includes a computer system 100 including an electronic memory 102 and a processor 104 configured to access and process a finite element modeling algorithm 106 stored in the electronic memory 102 and configured to produce a finite element model (See a graphical illustration in FIGS. 3 and 4) of a test coupon constructed of a known composite material based on a known construction and known characteristics for a plurality of crack lengths and a defined load and a displacement. The processor 104 can be configured to access and process a compliance curve algorithm 108 configured to generate a modeled compliance curve of loads versus displacement (Example illustrated in FIG. 5) by calculating an initial fracture energy for the test coupon for each of the plurality of crack lengths (a) and a defined load (N) and a displacement (mm). The processor can be configured to access and process a derivative algorithm 110 configured to calculate a derivative of the modeled compliance curve (Example illustrated in FIG. 7) for each of the plurality of crack lengths and developing a master curve fitting derivative curve of compliance. The processor 104 can be configured to control the computing system to receive crack length test data at the computing system from coupon test data 112 captured from a test fixture 114 and plot compliance versus crack length test data and reduce the test data using the master curve fitting derivative curve. It should be noted that the test coupon modeled is representative of the geometry and material of a physical structure to be analyzed. For example, the skin on an aircraft fuselage or wing can be analyzed. The system can model a section of the skin that is of interest. The loads considered can be for example tensile loads. The Coupon test fixture, can be coupled to a test fixture computer and sensors 115 for capturing and processing the coupon test data.

One implementation of the technology as disclosed includes a system for analyzing intra-laminar test data including a processor configured to obtain from the reduced fracture energy data and intra-laminar fracture characterization under Mode I loading condition. The test coupon modeled can be one of a cross-ply or unidirectional configuration. The processor 104 can be configured for extrapolating the reduced test data for progressive failure analysis. A graphics processor 116 can be configured for generating data for a graphical representation of the fracture energy configured and formatted for display 120 by a graphical user interface 118.

Figure 2:
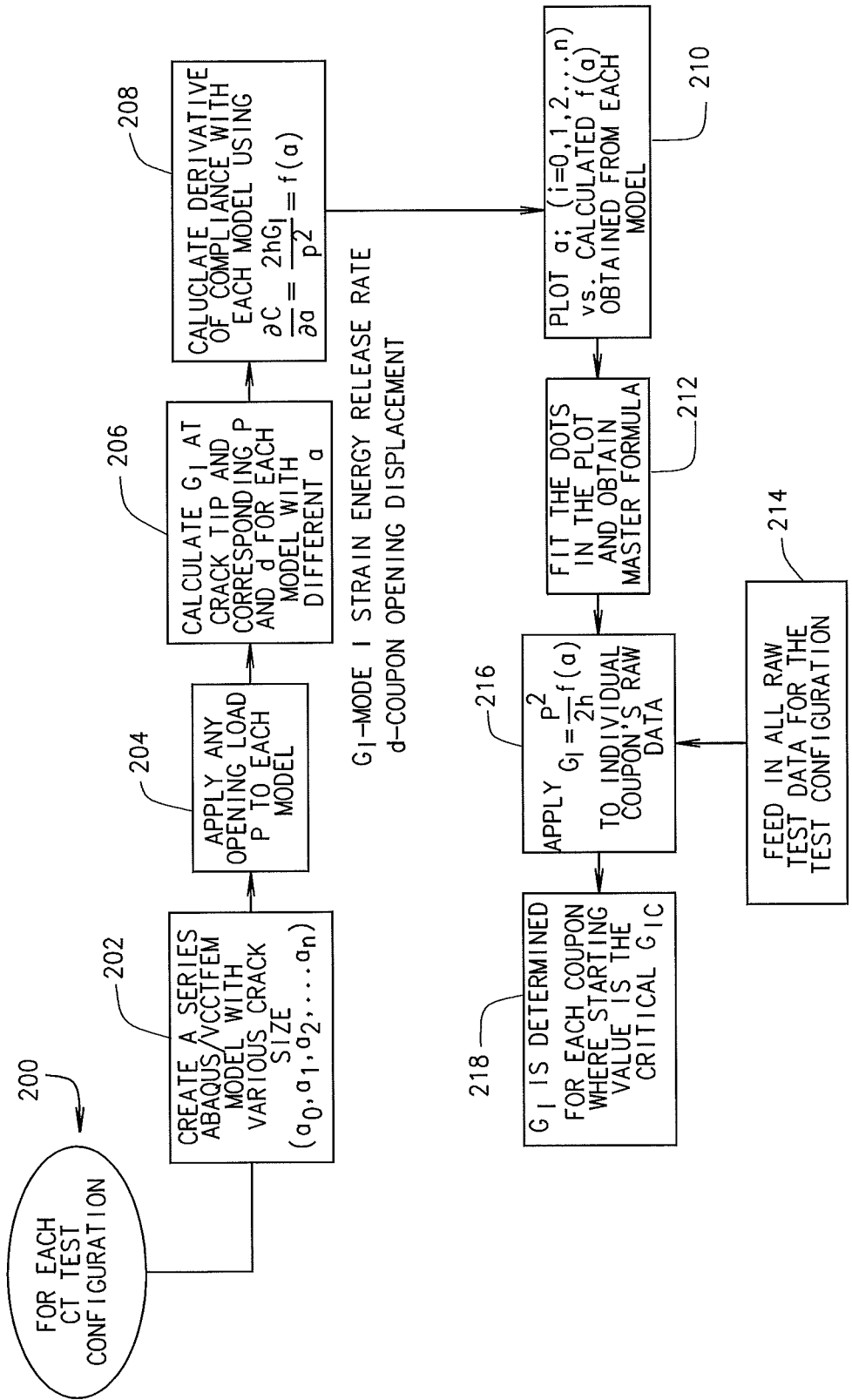
FIG. 2 is a flow diagram of the process.

Referring to FIG. 2, a flow diagram illustrating the method for compact tension test data reduction. For each compact tension test configuration 200 (See representative data in FIG. 6), one implementation of the method can include modeling 202 at a computer a test coupon using a finite element method for a plurality of crack lengths and a defined load and a displacement 204 (See FIG. 3 illustrative of a 3D finite element model and FIG. 5 for a Load vs. Displacement curve), where the computer can include a processor and a memory and where said modeling of the test coupon is performed by the processor and is based on parameter data stored in memory and representative of a known construction of a known composite material having known structural characteristics.

Figure 4:
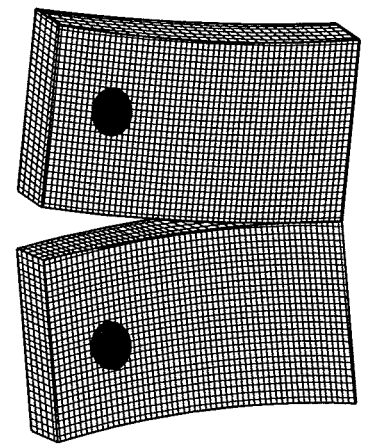
FIG. 4 is a graphical illustration of a 3D finite element model at crack tip.

One implementation of the method can include creating a modeled compliance curve of loads versus displacement 206 by calculating with the processor an initial fracture energy for the test coupon for each of the plurality of crack lengths (See FIG. 4 for a graphical illustration of the finite element model). The method can also include calculating with the processor a derivative of the modeled compliance curve 208 for each of the plurality of crack lengths and developing a master curve fitting derivative curve of compliance 210 (See FIG. 7 as a representative curve) by using the data from the finite element model 210 and curve fitting 212. Once the master curve has been determined for coupon model, the modeled test data and resulting master curve can be applied to actual test data for data reduction. It of course should be noted that the specific formula for the master curve will change based on the type of material, geometry and layup for the coupon being modeled. Crack length test data can be gathered 214 and plotting compliance versus crack length test data can be performed 214. The test data can be reduced by using the master curve fitting derivative curve by applying to the test data 216. The fracture energy test data can be obtained 218 from the reduced test data and intra-laminar fracture characterization under Mode I loading condition.

The test coupon modeled can be representative of the geometry and material of a physical structure. The load can be for example a tensile load. The test coupon modeled can be for example one of a cross-ply (See FIG. 6 as an illustration of representative data) or matrix configuration. The reduced test data can be extrapolated for progressive failure analysis. One implementation of the method can include generating data for a graphical representation of the fracture energy configured and formatted for display by a graphical user interface.

Figure 3:
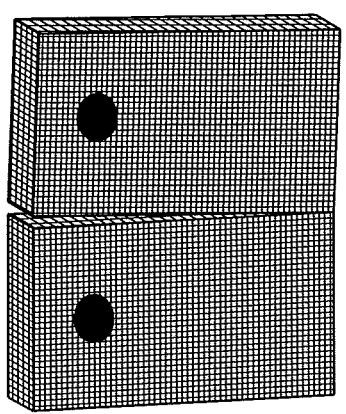
FIG. 3 is a graphical illustration of a 3D finite element model with load pins.

Referring to FIG. 3, a graphical illustration of a 3D finite element model with load pins is shown. This graphical illustration of the finite element model can be displayed to the user. Referring to FIG. 4, a graphical illustration of a 3D finite element model at crack tip is shown, which can also be displayed to the user of the technology. A finite element model is utilized to develop a master fitting curve for the test configuration by modeling a test coupon with various crack sizes. The mode strain energy release rate for each model with different crack sizes can be calculated. A load curve can be obtained that mimic the test curve. See FIG. 5 for a representative illustration.

Figure 5:
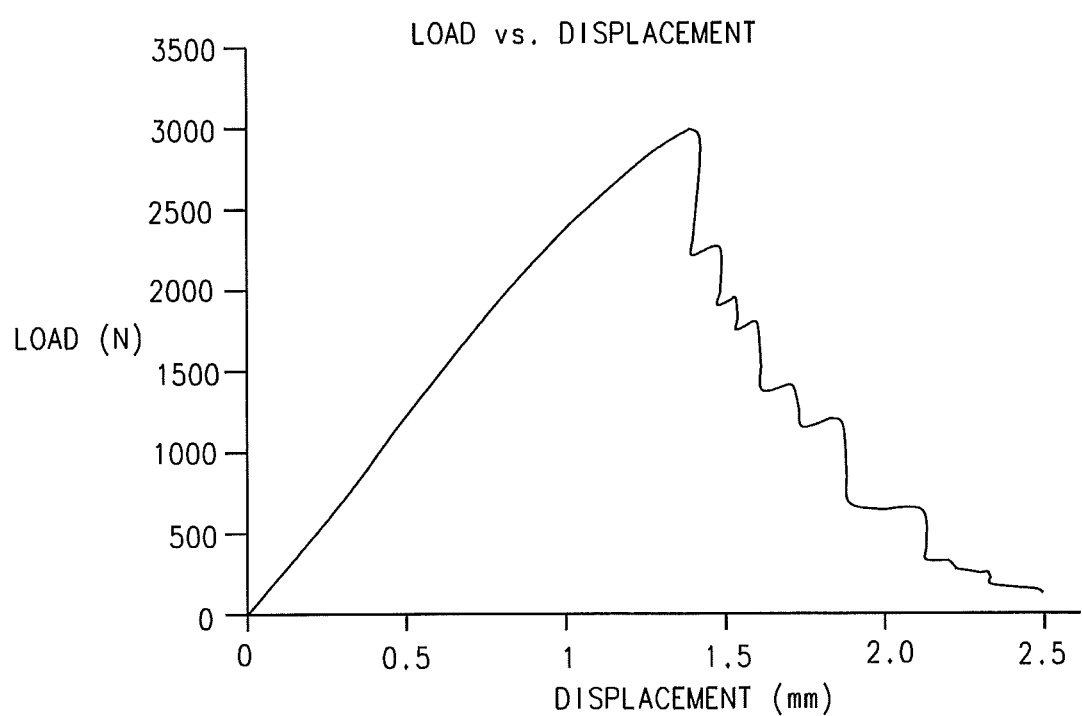
FIG. 5 is a graphical illustration of typical Load vs. Displacement test curve.
Figure 6:
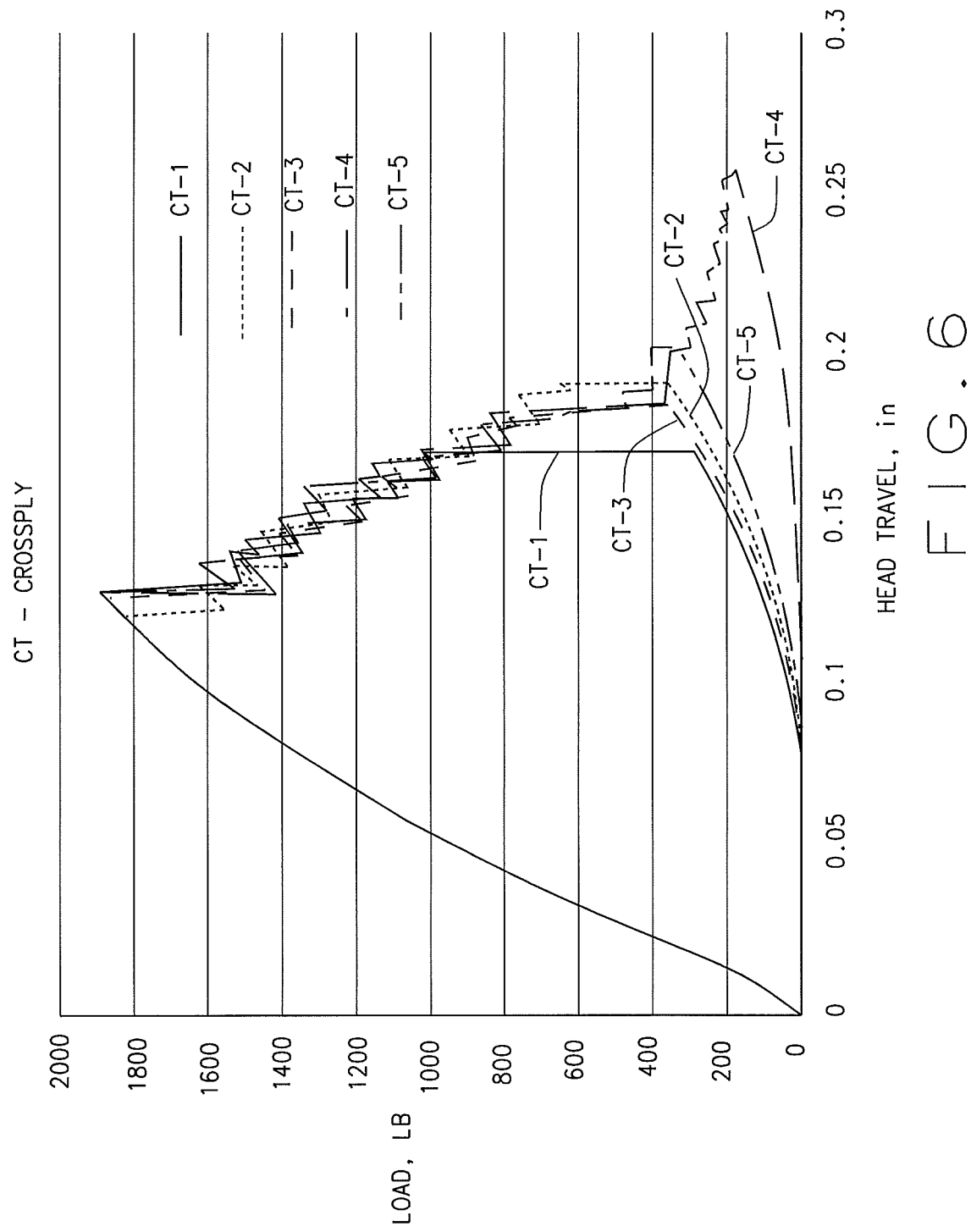
FIG. 6 is a graphical illustration of a set of Compact Tension (CT) test curve.
Figure 7:
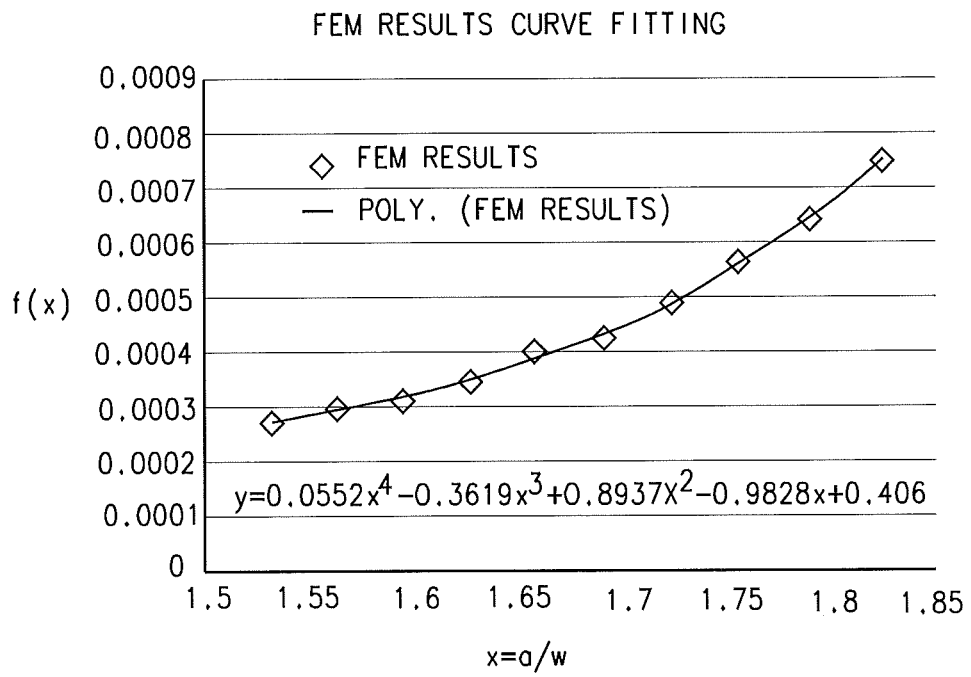
FIG. 7 is a graphical illustration of the finite element model of curve fitting.

Referring to FIG. 5, a graphical illustration of Load vs. Displacement compliance curve is shown, which can be generated using a finite element model of a coupon. Similarly, referring to FIG. 6, a graphical illustration of a set of Compact Tension (CT) test curve is shown. A master curve fitting derivative of compliance can be developed directly from the individual derivative of the compliance with each model using the FEM calculated strain energy release rate and the load under which the strain energy release rate is calculated. (See item 208 of FIG. 2). The method doesn't have to pick each failure load for the corresponding model because the relationship between $G_I$ (Mode I strain energy release rate) and $P^2$ (load squared) is linear (See item 208 of FIG. 2). Therefore, the master test data reduction formula can be applied to repeated test data (See item 216 of FIG. 2). Referring to FIG. 7, a graphical illustration of the finite element model of curve fitting is shown.

Figure 8:
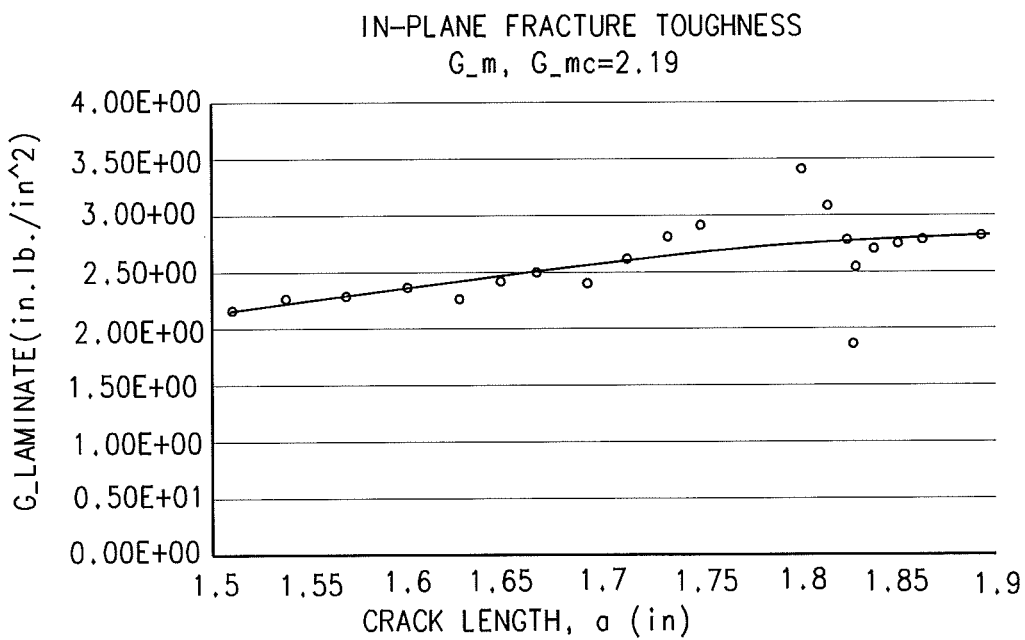
FIG. 8, is a graphical illustration of an in-plane fracture toughness.
Figure 9A:
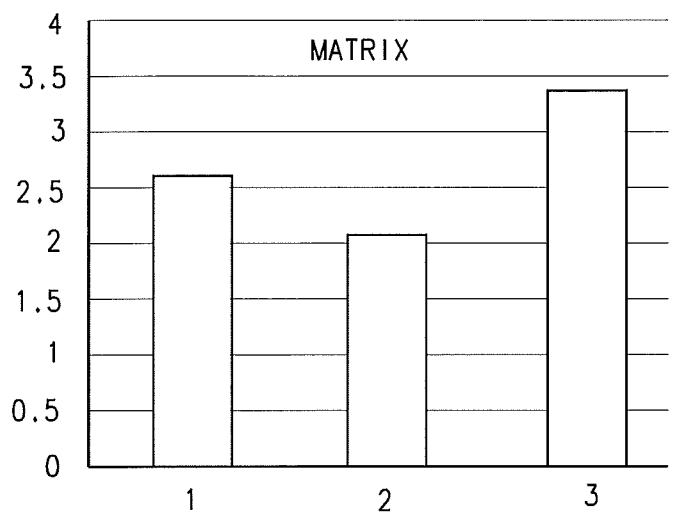
FIG. 9A is a graphical illustration of the standard deviation using conventional data reduction method.
Figure 9B:
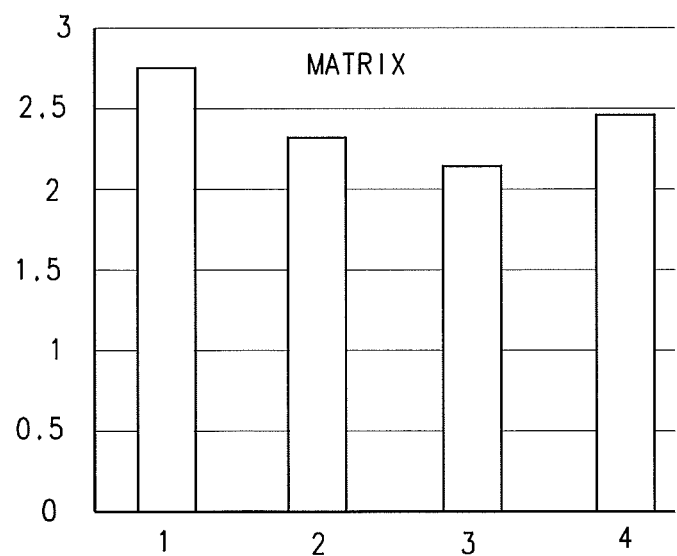
FIG. 9B is a graphical illustration of the standard deviation using the technology as disclosed and claimed herein.

Referring to FIG. 8, a graphical illustration of an in-plane fracture toughness is shown where curve fitting has been applied to the data for data reduction. Referring to FIG. 9A, a graphical illustration of the standard deviation using conventional data reduction method is shown. Referring to FIG. 9B, a graphical illustration of the standard deviation using the technology as disclosed and claimed herein. It is clear from this representative data that the standard deviation is significantly reduced thereby addressing the data scatter issue. An analytically derived master formula is not affected by test data variability and by determining the derivative of the compliance directly eliminates the derivation error.

The various implementations and examples shown above illustrate a method and system for analyzing composite material intra-laminar test data. A user of the present method and system may choose any of the above implementations, or an equivalent thereof, depending upon the desired application. In this regard, it is recognized that various forms of the subject method and system could be utilized without departing from the scope of the present technology and various implementations as disclosed.

Certain systems, apparatus, applications or processes are described herein as including a number of modules or algorithms. A module or algorithm may be a unit of distinct functionality that may be presented in software, embodied in hardware, or combinations thereof. When the functionality of a module or algorithm is performed in any part through software, the module includes a computer-readable medium. The modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example implementation, a machine can operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

The example computer system and client computers can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. A system for analyzing intra-laminar test data comprising:
   a test fixture computer system comprising a test fixture for holding a test coupon and a test fixture computer communicatively coupled to sensors configured to obtain coupon test data for a test coupon in the test fixture for a plurality of crack lengths and for a defined load and a displacement;
   a computer system including an electronic memory and a processor configured to access and process a finite element modeling algorithm stored in the electronic memory and configured to produce a finite element model of a modeled coupon constructed of a known composite material based on a known construction and known characteristics for a plurality of modeled crack lengths and a defined load, the computer system communicatively coupled to the test fixture computer system;
   said processor configured to generate modeled derivative of compliance data points by calculating a strain energy release rate for the modeled coupon for each of the plurality of modeled crack lengths and corresponding loads for each of the plurality of modeled crack lengths;
   said processor configured to fit a master derivative of compliance curve to the modeled derivative of compliance data points;
   said processor configured to control the computing system to receive the test data at the computing system and reduce the test data using the master derivative of compliance curve.

2. The system for analyzing intra-laminar test data as recited in claim 1, comprising:
   said processor configured to obtain from the reduced test data strain energy release rate and intra-laminar fracture characterization under Mode I loading.

3. The system for analyzing intra-laminar test data as recited in claim 2, where the modeled coupon is representative of the geometry and material of a physical structure.

4. The system for analyzing intra-laminar test data as recited in claim 2, where the load is a tensile load.

5. The system for analyzing intra-laminar test data as recited in claim 2, where the modeled coupon is a cross-ply configuration.

6. The system for analyzing intra-laminar test data as recited in claim 2, comprising:
said processor configured for extrapolating the reduced test data for progressive failure analysis.

7. The system for analyzing intra-laminar test data as recited in claim 6, comprising:
a graphics processor configured for generating data for a graphical representation of the strain energy release rate configured and formatted for display by a graphical user interface.

8. A method for analyzing intra-laminar test data comprising:
obtaining coupon test data, using a test fixture and sensors coupled to a first computer, for a test coupon for a plurality of crack lengths and a defined load;
modeling at a second computer a modeled coupon using a finite element method for a plurality of modeled crack lengths and a defined load, said second computer having a processor and a memory and where said modeling of the modeled coupon is performed by the processor and is based on parameter data stored in memory and representative of a known construction of a known composite material having known structural characteristics;
creating modeled derivative of compliance data points by calculating with the processor a strain energy release rate for the modeled coupon for each of a plurality of modeled crack lengths and corresponding loads for each of the plurality of modeled crack lengths;
fitting, by the processor, a master derivative of compliance curve to the modeled derivative of compliance data points; and
reducing the coupon test data using the master derivative of compliance curve.

9. The method for analyzing intra-laminar test data as recited in claim 8, comprising:
obtaining from the reduced test data strain energy release rate and intra-laminar fracture characterization under Mode I loading.

10. The method for analyzing intra-laminar test data as recited in claim 9, where the modeled coupon is representative of the geometry and material of a physical structure.

11. The method for analyzing intra-laminar test data as recited in claim 9, comprising:
extrapolating the reduced test data for progressive failure analysis.

12. The method for analyzing intra-laminar test data as recited in claim 9, where the modeled coupon is a cross-ply configuration.

13. The method for analyzing intra-laminar test data as recited in claim 8, where the load is a tensile load.

14. The method for analyzing intra-laminar test data as recited in claim 8, comprising:
generating data for a graphical representation of the strain energy release rate configured and formatted for display by a graphical user interface.

15. A non-transitory computer readable storage medium for use in conjunction with a test fixture computer system comprising a test fixture for holding a test coupon and a test fixture computer communicatively coupled to sensors configured to obtain coupon test data for a test coupon in the test fixture for a plurality of crack lengths and for a defined load, and a computer system including a processor, the computer readable storage medium storing one or more programs including instructions configured for being accessed and processed by the test fixture computer and the second processor of the second computer system to cause the test fixture computer system and the computer system to perform operations comprising:
obtaining coupon test data, using the test fixture and the sensors, for a test coupon for a plurality of crack lengths and a defined load;
modeling with a finite element method a modeled coupon constructed of a known composite material based on a known construction and known characteristics for a plurality of modeled crack lengths and a defined load;
creating modeled derivative of compliance data points by calculating a strain energy release rate for the modeled coupon for each of the plurality of modeled crack lengths and corresponding loads for each of the plurality of modeled crack lengths;
fitting a master derivative of compliance curve to the modeled derivative of compliance data points; and
reducing the coupon test data using the master derivative of compliance curve.

16. The non-transitory computer readable storage medium for analyzing intra-laminar test data as recited in claim 15, comprising:
obtaining from the reduced test data strain energy release rate and intra-laminar fracture characterization under Mode I loading.

17. The non-transitory computer readable storage medium for analyzing intra-laminar test data as recited in claim 16, where the modeled coupon is representative of the geometry and material of a physical structure.

18. The non-transitory computer readable storage medium for analyzing intra-laminar test data as recited in claim 16, where the modeled coupon is a cross-ply configuration.

19. The non-transitory computer readable storage medium for analyzing intra-laminar test data as recited in claim 16, comprising:
extrapolating the reduced test data for progressive failure analysis.

20. The non-transitory computer readable storage medium for analyzing intra-laminar test data as recited in claim 19, comprising:
generating data for a graphical representation of the strain energy release rate configured and formatted for display by a graphical user interface.

* * * * *